Dec. 30, 1941.  G. T. TOBIASSON  2,267,768
REACTION VESSEL
Filed Sept. 16, 1940  2 Sheets-Sheet 1

INVENTOR
GEORGE T. TOBIASSON
BY *Lee Carr*
ATTORNEY

Patented Dec. 30, 1941

2,267,768

UNITED STATES PATENT OFFICE 2,267,768

REACTION VESSEL

George T. Tobiasson, Chicago, Ill., assignor to Universal Oil Products Company, Chicago, Ill., a corporation of Delaware Application September 16, 1940, Serial No. 357,002

6 Claims. (Cl. 23—288)

The invention provides an improved form of reactor adapted to be used in conducting hydrocarbon conversion reactions of the type employing fixed beds of granular contact material or catalyst which is rapidly fouled or rendered relatively inactive by the deposition thereon of deleterious heavy conversion products.

Some of the best known catalytically promoted hydrocarbon conversion reactions of this general type are cracking, dehydrogenation, isomerization, aromatization, cyclization and dehydrocyclization, hydrogen transfer reactions and the like. The features of the apparatus provided by the invention make it advantageous as a reactor in which to conduct the specific reactions mentioned, as well as all other catalytically promoted reactions and contact processes of the general type indicated. It is not limited to operations involving the catalytic conversion of hydrocarbons, but will be found useful in any process wherein frequent reactivation of a bed of catalyst or contact material is required.

It is common practice in operations of the character above mentioned to employ a plurality of reactors each containing one or more beds of granular contact material which, while in active state, is capable of promoting the desired conversion reaction and to effect conversion of the reactants in one or more of said reactors while previously used catalyst in one or more of the other reactors of the group is being reactivated for further use. Reactivation of the catalyst is ordinarily accomplished by burning the deleterious deposits of combustible material therefrom in a stream of hot oxidizing gases. Such reactivation is, of course, accompanied by the liberation of substantial quantities of heat and since the activity of the catalysts generally employed is permanently impaired or destroyed at high temperatures, provision must ordinarily be made for controlling the temperature of the catalyst bed during reactivation. This is usually accomplished by circulating a convective fluid, which acts as a cooling medium, in indirect heat transfer relation with the catalyst and the reactivating gas stream in the reactor.

On the other hand, the processing phase of the operating cycle is quite often endothermic and in such cases it is good practice to transfer heat from the reactor wherein reactivation is taking place to the reactor wherein conversion of the reactants is being accomplished in order to supply at least a portion of the required endothermic heat of reaction to the latter.

In the present invention, instead of employing a plurality of reactors which are alternately employed in processing of the reactants and reactivation of the catalyst, I provide a reactor having a plurality of separate, superimposed beds of catalytic material with means for accomplishing conversion of the reactants and reactivation of the catalyst simultaneously in alternate catalyst beds. With this improved form of reactor, heat is transmitted directly from the catalyst beds in which reactivation of the catalyst is taking place and from the reactivating gas stream to the reactants undergoing conversion and to the adjacent catalyst beds in which conversion of the reactants is taking place. With the present invention, this is accomplished in a reactor of relatively simple form without the use of a special circulating stream of convective fluid such as conventionally employed in processes involving simultaneously conducted endothermic and exothermic reactions.

The accompanying drawings diagrammatically illustrate a reactor embodying the features provided by the invention.

Fig. 1 of the drawings represents an elevational view of the reactor, shown principally in section.

Figure 1:
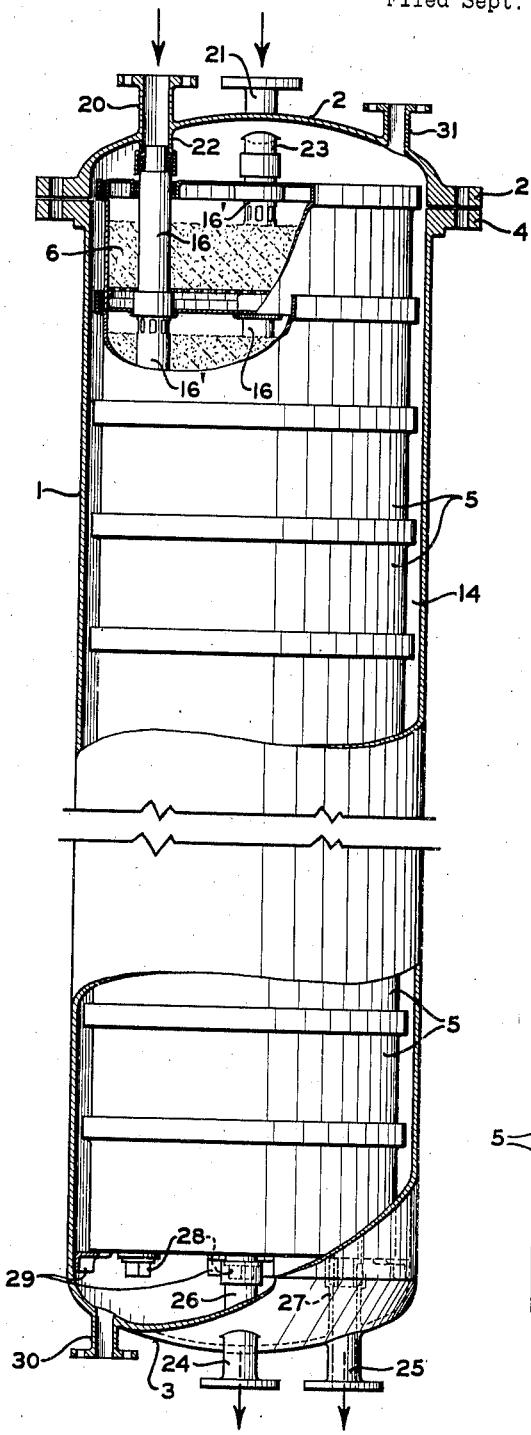

Referring to the drawings, the outer shell of the reactor is designated by the reference numeral 1 and is an elongated cylindrical vessel constructed of a suitable metal or metallic alloy capable of withstanding the operating conditions to which it is subjected. The upper head 2 of the reactor is flanged about its outer periphery, as indicated at 2', and may be attached by suitable bolts, not illustrated, to a companion flange 4 on the cylindrical shell. The lower head 3 of the reactor, in the particular case here illustrated, is integral with the cylindrical shell but, when desired, may be flanged and made removable in the same manner as upper head 2. The shell and heads may, when desired, be insulated against heat loss therethrough by suitable insulation, not shown applied either on the interior or exterior of the shell and heads.

A plurality of cylindrical pans 5, somewhat smaller in maximum diameter than the internal diameter of the shell 1, are mounted within the latter and a bed of suitable granular contact material or catalyst, indicated at 6, is disposed in each of the trays. The individual trays are each open at the top, except when assembled as shown and are provided adjacent the closed bottom 7 with a perforate plate or the like 8 which supports the catalyst bed, leaving a substantial space 9, the function of which will be later explained, between members 7 and 8. When desired, a suitable screen 10 of sufficiently small mesh to retain the catalyst particles may be disposed over the upper surface of perforate plate 8 in order that openings of substantial size may be provided in the latter. The perforate member 8 is supported around its outer periphery, in the case here illustrated, by a member 11 which may be welded or otherwise secured to the metal walls of the tray. The trays 5 are flared outwardly at their upper ends, as indicated at 12, sufficiently to allow the lower portion of the succeeding higher tray to nest therein and leaving a space between the walls of the nested trays for packing, which is indicated at 13, to substantially seal the space within the trays from the annular space 14 (see Fig. 1) provided between the trays and the shell 1 of the reactor.

The depth of the catalyst beds 6 in the trays is somewhat less than the vertical distance between perforate member 8 and the bottom of the next higher tray so that a space 15, the function of which will be later explained, is provided between the top of each catalyst bed and the bottom of the adjacent superimposed tray.

Figure 3:
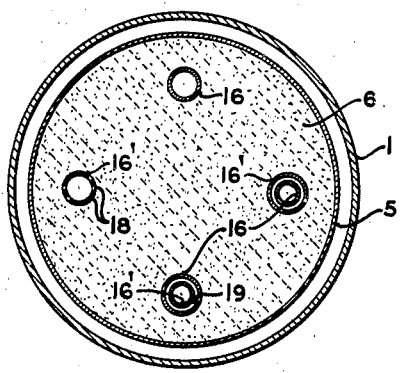
Fig. 3 is a cross-sectional view of one of the catalyst pans, this section being taken, for example, along a plane indicated by the line 3—3 in Fig. 2.

Each of the catalyst trays is provided with a plurality of spaced pipes or tubular conduit sections 16 and 16', four such members, which is the minimum, being employed in the case here illustrated and spaced a uniform distance apart as illustrated in Fig. 3. The conduit sections 16 and 16' each extend through the catalyst bed on the particular tray to which they are affixed and are similar in construction, except that the outwardly flared end portions 17 on diametrically opposite conduits are reversed, the outwardly flared ends on two adjacent conduits pointing upwardly and being positioned in space 15 above the catalyst bed and the outwardly flared ends on the other two adjacent conduits of the same tray pointing downwardly and being disposed in the space 9 beneath the catalyst bed. Another point of dissimilarity is that two diametrically opposite conduit sections 16' in each pan have openings 18 provided through their walls adjacent the end thereof opposite the flared portion 17, while the other two diametrically opposite conduits 16 on the same tray are imperforate. Openings 18 in one of the conduit sections 16' of each tray occur in that portion of the conduit where it extends through space 9 beneath the catalyst bed and the openings 18 in the other perforate conduit section 16' of the same tray are disposed in that portion of the latter which passes through the space 15 above the catalyst bed.

Figure 5:
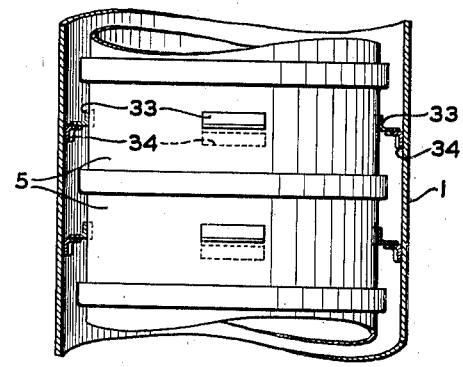
Fig. 5 illustrates means of individually supporting the trays 5 of the reactor from the shell 1, instead of supporting the assembly from the bottom as shown in Fig. 1.

The assembly of catalyst trays may be supported from the bottom, as indicated in Fig. 1, by means of members 29 attached to shell 1 and upon which the lowermost tray rests, or each tray may be separately supported from the shell, for example, as indicated in Fig. 5. In Fig. 5 spaced supporting lugs 33 attached to the pans, rest on supports 34 attached to shell 1 at suitable spaced points thereon.

Figure 2:
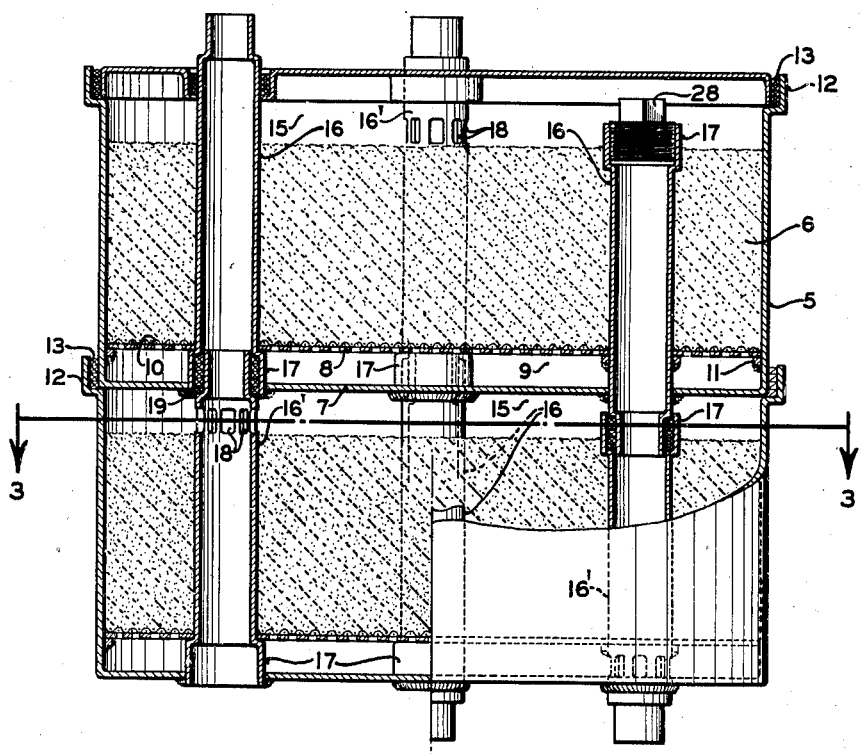
Fig. 2 is an enlarged detail, shown principally in section, of the two uppermost catalyst pans of the reactor illustrated in Fig. 1.
Figure 4:
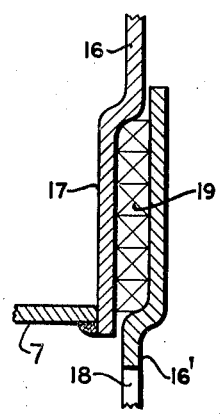
Fig. 4 is an enlarged fragmentary view illustrating, in cross-section, the packed joint between sections 16 and 16' of the conduits within the reactor.

When assembled for use in the reactor, adjacent catalyst pans are oriented at an angle of 90 degrees from each other, alternate trays throughout the assembly having the same orientation. In this manner, with the construction and disposition of conduit sections 16 and 16' as above described and illustrated in Fig. 2, the aligned members 16 and 16' which nest together at their ends and are packed where they join, as indicated at 19 in Fig. 4, form four individual conduits, each of which extend through the catalyst beds on all of the pans 5. One of these conduits serves to admit the reactants to be converted into contact with the catalytic material on alternate trays throughout the reactor. The diametrically opposite conduit serves as a gathering means for removing the converted reactants from the same set of alternate trays. One of the other conduits serves as a means of distributing reactivating gases to the other alternate set of trays in the assembly and the conduit diametrically opposite that last mentioned serves as a gathering means for spent reactivating gases in said other set of alternate trays.

Either upward or downward flow of reactants and resulting conversion products may be employed through the catalyst beds wherein the catalytically promoted conversion reaction is taking place. Similarly, either upward or downward flow of reactivating gases may be employed through the catalyst beds wherein reactivation of the catalyst is taking place and the direction of flow of the two streams (reactants and reactivating gases) may be concurrent or countercurrent, as desired. In the particular case here illustrated, we will consider that downward flow of reactants and reactivating gases is employed. Thus, the inlet connections for reactants to be converted and for reactivating gases are at the top of the reactor and the outlet connections for conversion products and for spent reactivating gases are at the bottom of the reactor. One of the inlet connections comprises nozzle 20 in the upper removable head 3 of the reactor and the other inlet connection comprises nozzle 21 in this upper head. Inner extensions 22 and 23 of the respective nozzles 20 and 21 fit over the upper ends of the conduits comprising the members 16 and 16' with which they are aligned. Outlet nozzles 24 and 25 in the lower head of the reactor have extensions 26 and 27, respectively, which fit within the flared lower ends of the conduit sections 16 and 16' which are aligned with nozzles 24 and 25 respectively. The conduits formed by members 16 and 16' which are in alignment with nozzles 20 and 21, are closed at their lower ends in any desired manner, this being accomplished, in the case here illustrated, by plugs 28 which are threaded into the ends of members 16 and 16' protruding from the lowermost tray. The upper ends of the conduits formed by members 16 and 16' which are in alignment with nozzles 24 and 25, are closed at their upper ends by other plugs 28 threaded into the flared upper ends 17 of the conduit sections.

Assuming that, with the arrangement illustrated, the first, third and each succeeding odd numbered tray is being employed as the zone wherein conversion of the reactants is taking place and that the second, fourth and each succeeding even numbered tray is being employed as a zone wherein reactivation of the catalyst therein is taking place, the stream of reactants, preferably preheated to the desired conversion temperature, is supplied to the reactor through nozzle 21 and the heated reactants are distributed through perforations 18 in the conduit aligned with nozzle 21 to the space 15 above the first, third and each succeeding odd numbered catalyst bed. The perforations in the conduit sections which are in alignment with outlet nozzle 24 communicate with the spaces 9 beneath the odd numbered catalyst beds and collect the conversion products resulting from passage of the heated reactants downwardly through these beds from the spaces 15 to the spaces 9. Thus, the main stream of reactants supplied to nozzle 21 is divided into a plurality of separate smaller streams of substantially equal volume which flood the spaces 15 above the odd numbered catalyst beds and, after passing through the respective catalyst beds, the separate streams of reactants are commingled in the conduit communicating with outlet nozzle 24 and pass from the latter to subsequent separating and recovery equipment which is not a novel part of the present invention and is, therefore, not illustrated.

While the reactants to be converted are supplied to the reactor through nozzle 21, the oxygen-containing gases employed for effecting reactivation of the catalyst on the even numbered trays of the reactor are supplied to nozzle 20, preferably at a temperature suitable for initiating combustion of the deleterious conversion products deposited in the catalyst beds during their previous use for promoting the conversion reaction. The perforations in the conduit formed by members 16 and 16' which are in alignment with nozzle 20 communicate with the spaces 15 above the catalyst beds in the even numbered trays and distribute the main stream of reactivating gases as a plurality of smaller streams of substantially equal volume to these spaces wherefrom they flow through the catalyst beds in the even numbered trays, burning the combustible deposits therefrom, and the resulting spent reactivating gases and combustion products pass from the spaces 9 of the even numbered trays through the perforations 18 in members 16' which are in alignment with outlet nozzle 25 and are discharged from the latter, preferably to suitable heat recovery equipment which is not a part of the present invention and is, therefore, not illustrated.

At the end of that phase of the operating cycle above described (i. e., when the catalyst beds in the even numbered trays of the reactor have been reactivated to the desired degree) relatively insert gases, such as, for example, combustion gases substantially devoid of oxygen may be supplied to the reactor through inlet nozzle 20 to purge the reactivated catalyst beds of oxygen-containing gases. Following this, the stream of heated reactants to be converted is diverted from nozzle 21 to nozzle 20 and the stream of relatively inert purging gases is supplied to the reactor through nozzle 21 and the communicating conduit to purge the catalyst beds wherein processing of the reactants has just been completed of reactants and conversion products. During the last described phase of the operating cycle as conversion products begin to discharge from nozzle 24 this stream is diverted to the separating and recovery equipment and as purged gases appear in the stream discharged from the reactor through nozzle 25, this stream is diverted from the separating and recovery equipment. Then when purging has been completed in the catalyst beds of the odd numbered trays of the reactor and while processing of the reactants is being accomplished in the catalyst beds of the even numbered trays of the reactor, oxygen-containing gases are supplied to the reactor through nozzle 21 and the communicating conduit to reactivate the catalyst beds employed to promote the conversion reaction in the preceding phase of the operating cycle. Thus, by manipulation of the inlet and outlet streams through suitable switching valves which do not constitute a novel part of the invention and are, therefore, not illustrated, one reactor is employed for conducting both the endothermic and the exothermic reactions and each of the catalyst beds is alternately in endothermic and in exothermic operation, each type of reaction occurring in alternate catalyst beds throughout the reactor. By virtue of this mode of operation and construction of the reactor, a considerable amount of heat is transferred from the exothermic to the endothermic reaction and the latter may be accomplished with little or no drop in temperature between the various catalyst beds in which it is accomplished. Heat supplied from the exothermic to the endothermic reaction also materially assists in preventing an excessive temperature rise in the catalyst beds during reactivation thereof.

In order to assist in equalizing the temperature within the reactor and assist in preventing leakage of reactants, reactivating gases and products of conversion and reactivation between the various catalyst pans, the invention provides, when desired, for blanketing the catalyst pan assembly with a relatively inert fluid, preferably maintained at a higher pressure than that employed in the catalyst beds, so that any leakage which occurs past packing 13 between the catalyst trays is into rather than from the spaces 15 above the catalyst beds. This is accomplished by flooding the space within the reactor about the assembly of catalyst trays with the relatively inert fluid employed, the latter being admitted, in the case here illustrated, (see Fig. 1) to the annular space 14 between the catalyst pans of the reactor shell through nozzle connection 30. Relatively inert fluid such as steam, oxygen-free combustion gases, carbon dioxide, for example, and which may be generated and heated to a suitable temperature, for example, by heat recovered from the hot reactivating gas stream leaving the reactor, may be supplied to the reactor through a suitable pressure regulating valve, not shown, in a conduit communicating with nozzle 30, whereby the desired pressure is maintained about the catalyst pan assembly and preferably, to prevent the generation of excessive pressure in the reactor, a suitable pressure relief valve, not shown, is mounted on nozzle 31 which is provided in the upper head 2 and communicates with the space surrounding the catalyst pan assembly.

I claim as my invention:

1. A reaction vessel comprising an elongated metallic shell, a plurality of superimposed metallic pans disposed within said shell and each adapted to retain a bed of granular contact material, a space being provided above and beneath said bed in each pan, a distributing conduit extending into the assembly of superimposed pans and communicating with an inlet connection in said shell, the said conduit being provided with openings in its walls in communication with the space above said beds on the first and each alternately succeeding pan, another distributing conduit extending into said assembly and communicating with another inlet connection in said shell and provided with openings through its walls in communication with the space above said beds in the second and each alternately succeeding pan, a collecting conduit extending into the said assembly of superimposed pans, communicating with an outlet connection in said shell and provided with openings through its wall in communication with the space beneath said beds in the first and each alternately succeeding pan, and another collecting conduit extending into the said assembly, communicating with another outlet conduit in said shell and provided with openings through its wall in communication with the space beneath said beds in the second and each alternately succeeding pan.

2. The apparatus defined in claim 1, wherein each of said conduits comprises a plurality of sections corresponding to the number of pans in said assembly, one of said sections of each of said conduits being joined to each pan and being removable from the assembly therewith, substantially fluid-tight joints being provided between the several sections of each conduit.

3. The apparatus defined in claim 1, wherein the lower portion of each pan is adapted to nest within the upper portion of the succeeding lower pan of the assembly and to act as a cover for the latter, a separate cover being provided for the uppermost pan and packing being provided between the walls of the nested portions of the several pans.

4. The apparatus defined in claim 1, wherein the lower portion of each pan is adapted to nest within the upper portion of the succeeding lower pan of the assembly and to act as a cover for the latter, a separate cover being provided for the uppermost pan and packing being provided between the walls of the nested portions of the several pans, the assembly of superimposed pans being supported at the bottom from said shell and being sufficiently free at its upper end to permit longitudinal expansion and contraction thereof independent of said shell of the reactor.

5. The apparatus defined in claim 1, wherein the lower portion of each pan is adapted to nest within the upper portion of the succeeding lower pan of the assembly and to act as a cover for the latter, a separate cover being provided for the uppermost pan and packing being provided between the walls of the nested portions of the several pans, each pan being independently supported from said shell whereby the pan assembly may expand and contract with the shell, the packed joints between the pans permitting independent expansion and contraction of the latter.

6. The apparatus defined in claim 1, wherein an annular space is provided between the peripheral surfaces of said pans and said shell, the lower portion of each pan being nested within the upper portion of the succeeding lower pan of the assembly and packing being provided in the joints between said pans, the apparatus including means for admitting fluid from an external source into said annular space.

GEORGE T. TOBIASSON.